(12) United States Patent
Khan

(10) Patent No.: US 9,391,798 B2
(45) Date of Patent: Jul. 12, 2016

(54) INTER-POLICY SERVER COMMUNICATION VIA A POLICY BROKER

(75) Inventor: Naseem A. Khan, Oak Hill, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 497 days.

(21) Appl. No.: 13/232,626

(22) Filed: Sep. 14, 2011

(65) Prior Publication Data

US 2013/0067082 A1  Mar. 14, 2013

(51) Int. Cl.
*G06F 15/173* (2006.01)
*H04L 12/413* (2006.01)
*G06Q 30/00* (2012.01)

(52) U.S. Cl.
CPC .............. *H04L 12/413* (2013.01); *G06Q 30/00* (2013.01)

(58) Field of Classification Search
CPC ............... G06F 17/30902; H04L 63/0263; H04L 63/06; H04L 12/14; H04L 41/5051; H04L 63/18; H04L 47/805; H04W 28/16; H04W 28/18; H04W 28/24
USPC .......................................................... 709/225
See application file for complete search history.

(56) References Cited

U.S. PATENT DOCUMENTS

| 7,403,487 | B1* | 7/2008 | Foladare | H04L 41/0896 370/232 |
| 2010/0208607 | A1* | 8/2010 | Chin et al. | 370/252 |
| 2011/0058547 | A1* | 3/2011 | Waldrop | G06Q 30/0611 370/389 |
| 2012/0218924 | A1* | 8/2012 | Bhalla | H04L 47/824 370/310 |
| 2012/0303835 | A1* | 11/2012 | Kempf | H04W 24/02 709/235 |

OTHER PUBLICATIONS

Awduche et al., RSVP-TE: Extensions to RSVP for LSP Tunnels, Dec. 2001, Network Working Group of IETF, tools.ietf.org/html/rfc3209.*
"WT-203 Interworking between Next Generation Fixed and 3GPP Wireless Access", Revision: 09, Revision Date: Aug. 2011, broadband forum, draft bbf2009.1023, 57 pages.
"GSMA™ Inter-Service Provider IP Backbone Guidelines", GSM Association Official Document: IR.34, Version 4.4, Jun. 19, 2008, 52 pages.
"3$^{rd}$ Generation Partnership Project; Technical Specification Group Services and System Aspects; Policy and charging control architecture (Release 11)", 3GPP TS 23.203 V11.2.0, Jun. 2011, Technical Specification, 142 pages.

* cited by examiner

*Primary Examiner* — Ruolei Zong

(57) ABSTRACT

A device receives policy parameters for a user equipment moving from a first access network to a second access network. The device also translates the policy parameters to parameters understood by the second access network, and provides the translated policy parameters to the second access network. When the translated policy parameters are accepted by the second access network, the user equipment connects to the second access network in accordance with the translated policy parameters.

22 Claims, 8 Drawing Sheets

INTER-POLICY SERVER COMMUNICATION VIA A POLICY BROKER

BACKGROUND

Fixed-mobile convergence (FMC) is a change in telecommunications that attempts to remove differences between fixed or wireline networks and mobile or wireless networks. Currently, FMC does not support policy rules, such as quality of service (QoS) rules, when a subscriber roams from a wireless service provider network, which uses a wireless access network (e.g., a third generation (3G) network, a long term evolution (LTE) network, etc.), to a wireline service provider network, which uses a fixed-broadband access network, (e.g., a fiber network, a digital subscriber line (DSL) network, an Ethernet network, etc.), and vice-versa. Two major standards organizations, the Third Generation Partnership Project (3GPP) and the Broadband Forum (BBF), have unsuccessfully attempted to address this problem.

For example, policy servers based on 3GPP standards are either being developed, in trial, or are in the initial stages of deployment along with the LTE/3G+ deployment. One proposed solution suggests that a policy and charging rules function (PCRF) device, in an Enhanced Packet Core (EPC) of a wireless access network, provides the policy/QoS related parameters relevant in the wireless access network to a policy server (e.g., a broadband policy control function (BPCF) device) in a wireline access network. The policy/QoS parameters are provided from the PCRF device to the BPCF device through an interface when a subscriber switches from the wireless network to a fixed broadband network associated with the wireline access network. The BPCF device uses the policy/QoS parameters to enforce policy rules at a policy control enforcement function (PCEF) device, such as a router, for a subscriber session in the wireline network domain.

In such an arrangement, the BPCF device must provide mapping from the wireless access network-specific policy/QoS parameters to fixed broadband-specific policy/QoS parameters. In situations in which the wireline network cannot fully provide resource and policy/QoS requirements for the subscriber for a specific type of service, the BPCF device needs to provide a counter offer to the PCRF device. This requires two-way communications between policy servers from the wireless network and the wireline network, and results in a very complex and expensive architecture.

DETAILED DESCRIPTION OF PREFERRED EMBODIMENTS

Figure 1:
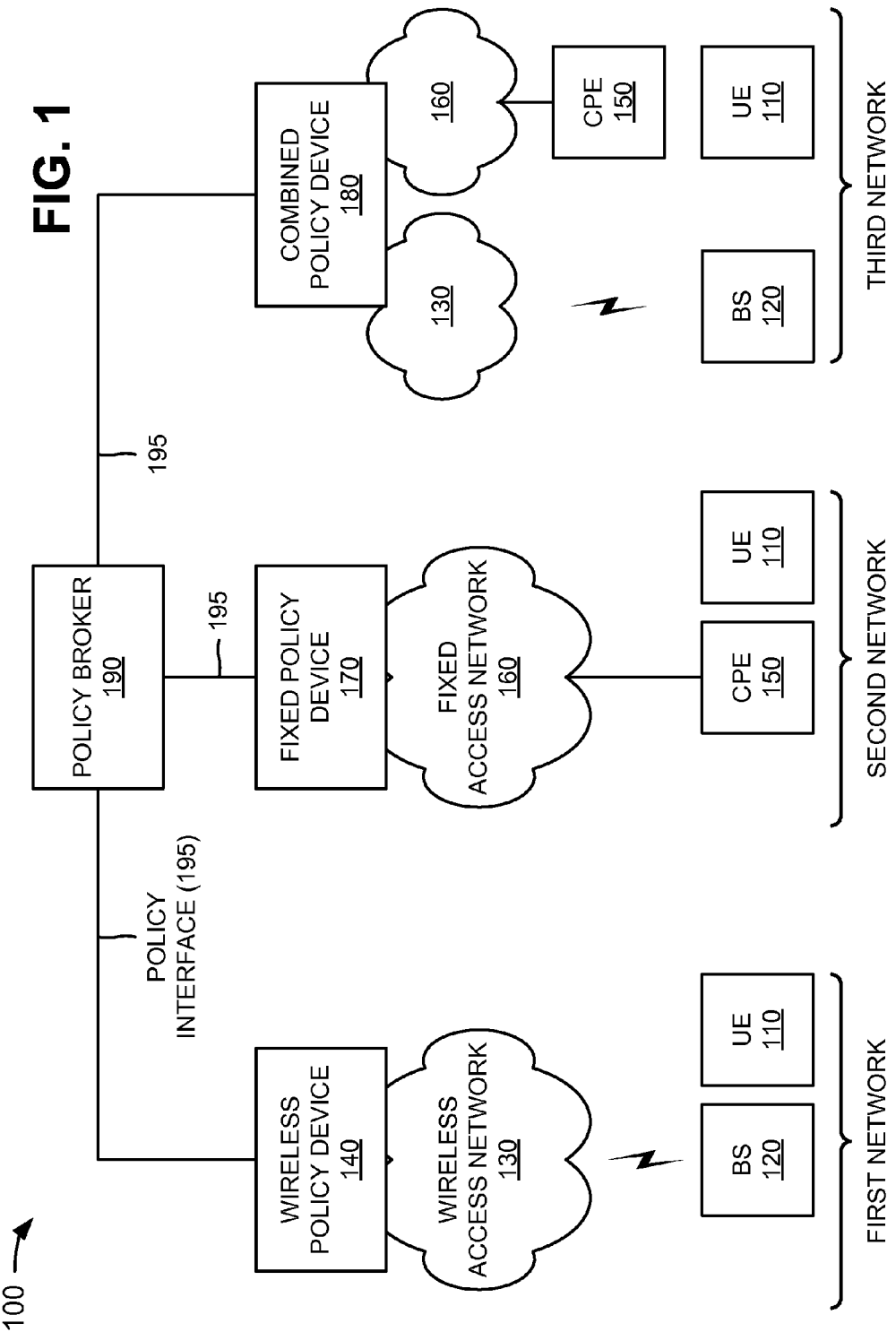
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide a policy broker between policy devices (e.g., a PCRF device, a BPCF device, etc.) of wireless and fixed access networks so that policy/QoS parameter may be exchanged between the policy devices. In one example implementation, the policy broker may receive policy parameters for a user equipment (UE) moving from a first access network (e.g., a wireless access network) to a second access network (e.g., a fixed access network). The policy broker may translate the policy parameters to parameters understood by the second access network, and may provide the translated policy parameters to the second access network. If the second access network accepts the translated policy parameters, the policy broker may enable the UE to connect to the second access network based on the translated policy parameters.

If the second access network does not accept the translated policy parameters, the policy broker may receive a request for modification of the policy parameters from the second access network, and may provide the request to the first access network. Prior to sending the request for modification of the policy parameters, the second access network may reserve network resources for the UE. If the modification request is accepted by the first access network, the policy broker may receive, based on the request, modified policy parameters from the first access network, may translate the modified policy parameters to parameters understood by the second access network, and may provide the translated, modified policy parameters to the second access network. The policy broker may enable the UE to connect to the second access network based on the translated, modified policy parameters. If the modification request is not accepted by the first access network, the first access network may inform the policy broker of the non-acceptance, and the policy broker may instruct the second access network to release the reserved network resources.

Such an arrangement may provide a less complex policy control architecture that may reduce platform development time and may reduce expenditures and operational costs for service providers. The arrangement may provide a highly scalable solution such that new service providers may be added without much complexity. The policy broker may reside in a third party interconnect network, separate from the wireless and fixed access networks, and may provide a policy service to wireless and fixed service providers that want to provide roaming services to each other. For example, a service provider does not need to deploy a policy broker. Instead, the service provider may use a policy broker located in a third party interconnect network and pay for the use of the policy broker.

As used herein, the terms "customer," "subscriber," and/or "user" may be used interchangeably. Also, the terms "customer," "subscriber," and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include UEs 110; base stations (BS) 120; a wireless access network 130 with a wireless policy device 140; customer premises equipment (CPE) 150; a fixed access network 160 with a fixed policy device 170; a combined policy device 180 associated with another wireless access network 130 and another fixed access network 160; and a policy broker 190. As further shown in FIG. 1, one UE 110, one BS 120, one wireless access network 130 and wireless policy device 140 may form a first service provider network, such as a wireless service provider network. One UE 110, one CPE 150, one fixed access network 160, and fixed policy device 170 may form a second service provider network, such as a wireline service provider network. One UE 110, one BS 120, one CPE 150, one wireless access network 130, one fixed access network 160, and combined policy device 180 may form a third service provider network, such as an integrated or converged wireless/wireline service provider network. Devices and/or networks of network 100 may interconnect via wired and/or wireless connections.

Three UEs 110, two BSs 120, two wireless access networks 130, one wireless policy device 140, two CPEs 150, two fixed access networks 160, one fixed policy device 170, one combined policy device 180, and one policy broker 190 have been illustrated in FIG. 1 for simplicity. In practice, there may be more UEs 110, BSs 120, wireless access networks 130, wireless policy devices 140, CPEs 150, fixed access networks 160, fixed policy devices 170, combined policy devices 180, and/or policy brokers 190.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a wireless air card), a television, a personal computer, a WiFi access point (or hotspot), or other types of computation or communication devices. In one example, UE 110 may include a device that is capable of communicating over wireless access network 130 and/or fixed access network 160. In one example implementation, UE 110 may include a device that connects to fixed access network 160 via a WiFi access point (or hotspot). Alternatively, or additionally, UE 110 may include a device that connects to fixed access network 160 via CPE 150, such as a set-top box (STB).

BS 120 may include one or more computation and/or communication devices that receive traffic (e.g., video, voice, data, etc.) from wireless access network 130 and wirelessly transmit that traffic to UE 110. BS 120 may also include one or more devices that wirelessly receive traffic from UE 110 and transmit that traffic to wireless access network 130. In one example implementation, BS 120 may correspond to an eNodeB that combines the functionalities of a base station and a radio network controller (RNC) in 4G/3GPP LTE radio access networks.

Wireless access network 130 may include a communications network that wirelessly connects subscribers (e.g., UEs 110) to a service provider. In one example, wireless access network 130 may include an evolved packet core (EPC) network architecture of the 3GPP LTE wireless communication standard. Wireless access network 130 may include an all-Internet protocol (IP) packet-switched core network that supports high-speed wireless and wireline broadband access technologies. Alternatively, or additionally, wireless access network 130 may include a WiFi network (e.g., using IEEE 802.11 standards) or other access networks (e.g., an E-UTRAN, an enhanced high-rate packet data (eHRPD) network, a UTRAN, or a HRPD network).

Wireless policy device 140 may include one or more server devices, or other types of computation or communication devices, that gather, process, and/or provide information in a manner described herein. For example, wireless policy device 140 may include a device that provides policy control decision and flow based charging control functionalities. Wireless policy device 140 may provide network control (e.g., of wireless access network 130) regarding service data flow detection, network resource reservation, gating, QoS and flow based charging, etc. Wireless policy device 140 may determine how a certain service data flow shall be treated, and may ensure that user plane traffic mapping and treatment is in accordance with a user's subscription profile. In one example implementation, wireless policy device 140 may correspond to a PCRF of a 3GPP EPC network. Wireless policy device 140 may handle multimedia applications, such as voice over IP (VoIP), IP television (IPTV), short message service (SMS), multimedia message service (MMS), etc. applications, as well as data services (e.g., email services). Wireless policy device 140 may implement a policy architecture that includes policy decision functions (e.g., policy determination) and/or policy enforcement functions (e.g., enforcing the determined policy). Alternatively, or additionally, the policy enforcement functions may be implemented in a device separate from wireless policy device 140.

CPE 150 may include any equipment provided at the premises of a customer that may enable the customer (e.g., UE 110) to access a service provider. For example, CPE 150 may include a television, a digital video recorder (DVR), a STB, a router, a modem, a personal computer, a tablet computer, a WiFi access point, a femtocell, etc. As further shown in FIG. 1, CPE 150 may connect with fixed access network 160 via a wired connection, such as a fiber connection, a DSL connection, an Ethernet connection, a coaxial cable, etc.

Fixed access network 160 may include a communications network that connects subscribers (e.g., UEs 110) to a service provider. In one example implementation, fixed access network 160 may include a fixed-broadband access network, such as, for example, a fiber network, a DSL network, an Ethernet network, a coaxial cable, etc.

Fixed policy device 170 may include one or more server devices, or other types of computation or communication devices, that gather, process, and/or provide information in a manner described herein. For example, fixed policy device 170 may include a device that provides policy control decision and flow based charging control functionalities. Fixed policy device 170 may provide network control (e.g., of fixed access network 160) regarding service data flow detection, network resource reservation, gating, QoS and flow based charging, etc. Fixed policy device 170 may determine how a certain service data flow shall be treated, and may ensure that user plane traffic mapping and treatment is in accordance with a user's subscription profile. In one example implementation, fixed policy device 170 may correspond to a Broadband Forum BPCF in a wireline access network or a European Telecommunications Standards Institute (ETSI) Telecoms and Internet converged Services and Protocols for Advanced Networks (TISPAN) Resource and Admission Control Sub-System (RACS). Fixed policy device 170 may handle multimedia applications, such as VoIP, IPTV, SMS, MMS, etc. applications, as well as data services (e.g., email services). Fixed policy device 170 may implement a policy architecture that includes policy decision functions (e.g., policy determination) and/or policy enforcement functions (e.g., enforcing the determined policy). Alternatively, or additionally, the policy enforcement functions may be implemented in a device separate from fixed policy device 170.

Combined policy device 180 may include one or more server devices, or other types of computation or communication devices, that gather, process, and/or provide information in a manner described herein. For example, combined policy device 180 may include an integrated device that provides an integration or convergence of the features described above for wireless policy device 140 and fixed policy device 170.

Policy broker 190 may include one or more server devices, or other types of computation or communication devices, that gather, process, and/or provide information in a manner described herein. For example, policy broker 190 may include a device that provides an interface so that policy/QoS parameter may be exchanged between policy devices, such as wireless policy device 140, fixed policy device 170, and combined policy device 180. Policy broker 190 may handle multimedia applications, such as VoIP, IPTV, SMS, MMS, etc. applications, as well as data services (e.g., email services). Policy broker 190 may assess what service providers (e.g., associated with wireless access networks 130 and/or fixed access networks 160) accept for policy parameters or standards, what type of policy schemes are implemented by the service providers, etc. In one example, policy broker 190 may request and receive such information from the service providers' systems (in real time during the session request or in advance of the session request), and/or may be pre-provisioned with such information by the service provider. Such an arrangement may ensure that policy broker 190 knows what the service providers accept for policy parameters prior to receiving a session request from UE 110 moving from one access network to another access network. The policy parameters may include wireless QoS parameters (e.g., a QoS class identifier (QCI), an allocation and retention priority (ARP), a guaranteed bit rate (GBR), a maximum bit rate (MBR), etc.); fixed QoS parameters (e.g., guaranteed QoS information, a differentiated services code point (DSCP), etc.); information associated with reservation and admission control in Layer 2 and Layer 3 devices; etc. In one example, policy broker 190 may be provided in a cloud computing environment. Alternatively, or additionally, policy broker 190 may include virtual software provided on a commercial off-the-shelf computing device.

In one example implementation, policy broker 190 may receive policy parameters for a UE 110 moving from a first access network (e.g., wireless access network 130) to a second access network (e.g., fixed access network 160). Policy broker 190 may translate the policy parameters to parameters understood by the second access network, and may provide the translated policy parameters to the second access network. If the second access network accepts the translated policy parameters, policy broker 190 may enable UE 110 to connect to the second access network based on the translated policy parameters.

If the second access network does not accept the translated policy parameters, policy broker 190 may receive a request for modification of the policy parameters from the second access network, and may provide the request to the first access network. Prior to sending the request for modification of the policy parameters, the second access network may reserve network resources for UE 110. If the modification request is accepted by the first access network, policy broker 190 may receive, based on the request, modified policy parameters from the first access network, may translate the modified policy parameters to parameters understood by the second access network, and may provide the translated, modified policy parameters to the second access network. Policy broker 190 may enable UE 110 to connect to the second access network based on the translated, modified policy parameters. If the modification request is not accepted by the first access network, the first access network may inform policy broker 190 of the non-acceptance, and policy broker 190 may instruct the second access network to release the reserved network resources.

In one example implementation, policy broker 190 may be used in roaming situations, such as when a subscriber (e.g., UE 110) moves between two wireless access networks 130 or between wireless access network 130 and fixed access network 160. Alternatively, or additionally, policy broker 190 may be used in nomadic situations, such as when a subscriber (e.g., UE 110) moves between two fixed access networks 160. Policy broker 190 may be co-located in one of the first, second, or third service provider networks depicted in FIG. 1, or may be located in a third party service provider domain, such as an interconnect network (e.g., a Global System for Mobile Communications Association (GSMA) Internetwork Packet Exchange (IPX) network).

As further shown in FIG. 1, policy broker 190 may interface with wireless policy device 140, fixed policy device 170, and/or combined policy device 180 over a policy interface 195. Policy interface 195 may include an interface between two or more policy devices and may support UE 110 roaming scenarios. In one example, policy interface 195 may provide a 3GPP s9 type of interworking between two or more policy devices. Policy interface 195 may be a Diameter-based interface that establishes session pairs between a first policy device (e.g., wireless policy device 140) and policy broker 190 as well as between a second policy device (e.g., fixed policy device 170) and policy broker 190. In such an arrangement, policy broker 190 may act as a Diameter client/server (e.g., similar to a PCRF and BPCF) and may maintain policy parameter mappings, between the first policy device and policy broker 190 and between the second policy device and policy broker 190, for the same subscriber service request.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
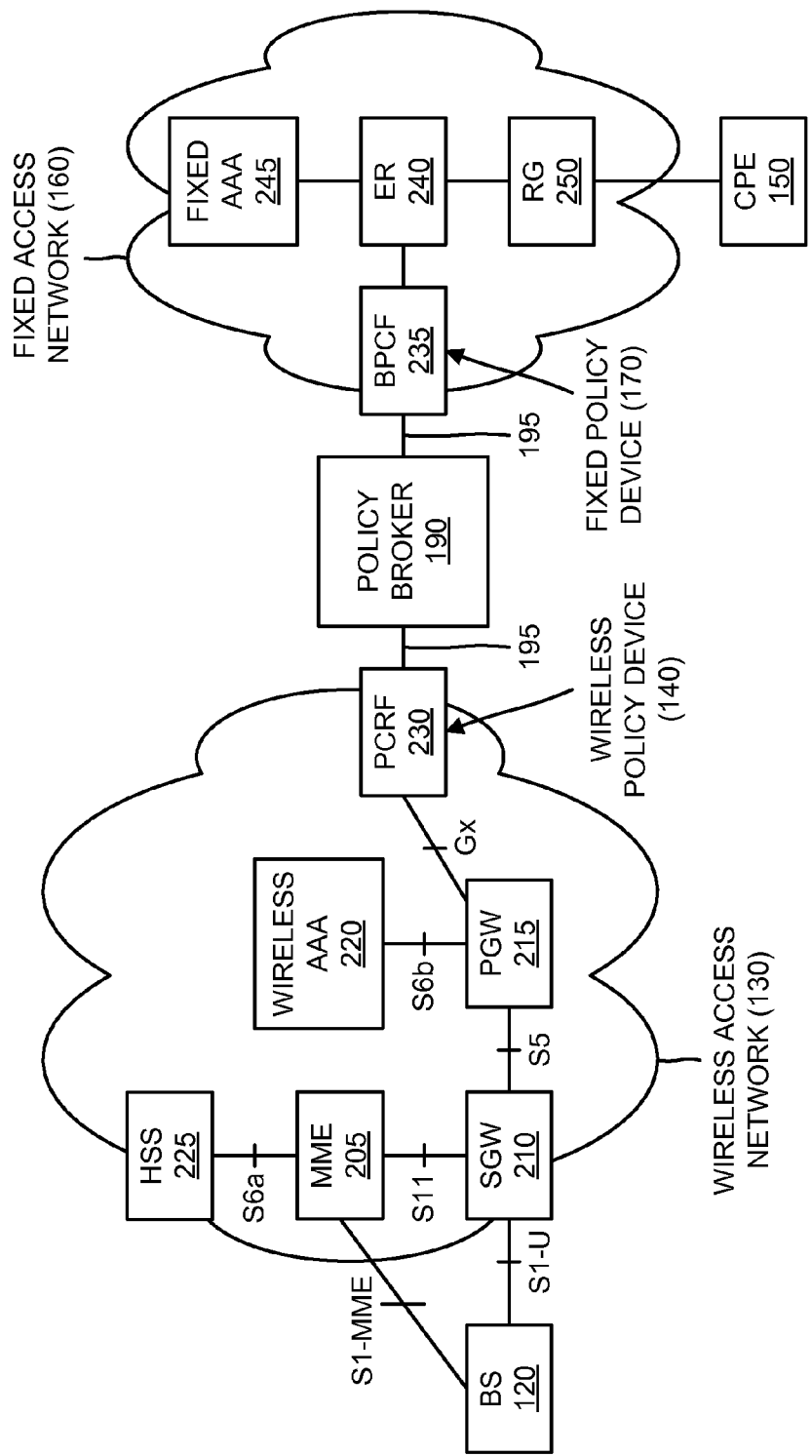
FIG. 2 is a diagram of another example network in which systems and/or methods described herein may be implemented.

FIG. 2 is a diagram of another example network 200 in which systems and/or methods described herein may be implemented. As illustrated, network 200 may include BS 120, wireless access network 130, wireless policy device 140, CPE 150, fixed access network 160, fixed policy device 170, and policy broker 190. BS 120, wireless access network 130, wireless policy device 140, CPE 150, fixed access network 160, fixed policy device 170, and policy broker 190 may include the features described above in connection with FIG. 1. As further shown in FIG. 2, wireless access network 130 may correspond to an EPC network that includes a a mobility management entity (MME) 205; a serving gateway (SGW) 210; a packet data network gateway (PGW) 215; a wireless authentication, authorization, and accounting (AAA) device 220, a home subscriber server (HSS) 225; and a PCRF 230 (e.g., which may correspond to wireless policy device 140).

Fixed access network 160 may correspond to a wireline network that includes a BPCF 235 (e.g., which may correspond to fixed policy device 170), an edge router (ER) 240, a fixed AAA device 245, and a residential gateway (RG) 250. Devices and/or networks of network 200 may interconnect via wired and/or wireless connections.

A single BS 120, wireless access network 130, wireless policy device 140, CPE 150, fixed access network 160, fixed policy device 170, policy broker 190, MME 205, SGW 210, PGW 215, wireless AAA device 220, HSS 225, PCRF 230, BPCF 235, ER 240, fixed AAA device 245, and RG 250 have been illustrated in FIG. 1 for simplicity. In practice, there may be more BSs 120, wireless access networks 130, wireless policy devices 140, CPEs 150, fixed access networks 160, fixed policy devices 170, policy brokers 190, MMEs 205, SGWs 210, PGWs 215, wireless AAA devices 220, HSSs 225, PCRFs 230, BPCFs 235, ERs 240, fixed AAA devices 245, and RGs 250.

As further shown in FIG. 2, BS 120 may interface with MME 205 over a S1-MME interface, and may interface with SGW 210 over a S1-U interface. MME 205 may interface with SGW 210 over a S11 interface, and may interface with HSS 225 over a S6a interface. SGW 210 may interface with PGW 215 over a S5 interface. PGW 215 may interface with wireless AAA device 220 over a S6b interface, and may interface with PCRF 230 over a Gx interface. PCRF 230 and BPCF 235 may interface with policy broker 190 via policy interface 195. BPCF 235 may interconnect with ER 240, and ER 240 may interconnect with fixed AAA device 245 and RG 250. RG 250 may interconnect with CPE 150 or may be included in CPE 150.

MME 205 may include one or more computation and/or communication devices that may be responsible for idle mode tracking and paging procedures (e.g., including retransmissions) for UE 110 (not shown in FIG. 2). MME 205 may be involved in a bearer activation/deactivation process (e.g., for UE 110) and may choose a SGW for UE 110 at a time of an initial attach and at a time of handover. MME 205 may authenticate UEs 110 via interaction with HSS 225. Non-access stratum (NAS) signaling may terminate at MME 205 and MME 205 may generate and allocate temporary identities to UEs 110. MME 205 may check authorization of UE 110 to camp on a service provider's Public Land Mobile Network (PLMN) and may enforce roaming restrictions for UE 110. MME 205 may be a termination point in wireless access network 130 for ciphering/integrity protection for NAS signaling and may handle security key management. MME 205 may provide a control plane function for mobility between LTE and access networks.

SGW 210 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 210 may route and forward user data packets, may act as a mobility anchor for a user plane during inter-eNodeB handovers, and may act as an anchor for mobility between LTE and other 3GPP, 3GPP2 (e.g., code division multiple access (CDMA)), and UTRAN technologies. For an idle state UE 110, SGW 210 may terminate a downlink (DL) data path and may trigger paging when DL data arrives for UE 110. SGW 210 may manage and store contexts associated with UE 110 (e.g., parameters of an IP bearer service, network internal routing information, etc.).

PGW 215 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 215 may provide connectivity of UE 110 to external packet data networks (PDNs) by being a traffic exit/entry point for UE 110. UE 110 may simultaneously connect to more than one PGW 215 for accessing multiple PDNs. PGW 215 may perform policy enforcement, packet filtering for each user, charging support, lawful intercept, and packet screening. PGW 215 may also act as an anchor for mobility between 3GPP and non-3GPP technologies.

Wireless AAA device 220 may include one or more server devices, or other types of computation or communication devices, that gather, process, search, and/or provide information in a manner described herein. In one example implementation, wireless AAA device 220 may provide IP functionality to support authentication, authorization, and accounting functions. With regard to the authentication function, wireless AAA device 220 may verify a device's (e.g., UE's 110) specific digital identity provided via an identifier (e.g., a password, a digital certificate, a phone number, etc.) associated with the device. With regard to the authorization function, wireless AAA device 220 may grant or refuse privileges to a device (e.g., UE 110) for accessing specific services (e.g., IP address filtering, address assignment, route assignment, QoS, etc.). With regard to the accounting function, wireless AAA device 220 may track consumption of network resources by users (e.g., by UE 110) and may use this information for management, planning, billing, etc.

HSS 225 may include one or more computation or communication devices that gather, process, search, and/or provide information in a manner described herein. In one example implementation, HSS 225 may include a master user database that supports devices of wireless access network 130 that handle calls. HSS 225 may include subscription-related information (e.g., subscriber profiles, service profiles, etc.), may perform authentication and authorization of a user, and may provide information about a subscriber's location and IP information.

PCRF 230 may include one or more server devices, or other types of computation or communication devices, that gather, process, and/or provide information in a manner described herein. For example, PCRF 230 may include a 3GPP policy device that provides policy control decision and flow based charging control functionalities. PCRF 230 may provide network control regarding service data flow detection, network resource reservation, gating, QoS and flow based charging, etc. PCRF 230 may determine how a certain service data flow shall be treated, and may ensure that user plane traffic mapping and treatment is in accordance with a user's subscription profile. In one example implementation, PCRF 230 may include the features of wireless policy device 140 described above in connection with FIG. 1. PCRF 230 may handle multimedia applications, such as VoIP, IPTV, SMS, MMS, etc. applications, as well as data services (e.g., email services). PCRF 230 may implement a policy architecture that includes policy decision functions (e.g., policy determination) and/or policy enforcement functions (e.g., enforcing the determined policy). Alternatively, or additionally, the policy enforcement functions may be implemented in a device separate from PCRF 230.

BPCF 235 may include one or more server devices, or other types of computation or communication devices, that gather, process, and/or provide information in a manner described herein. For example, BPCF 235 may include a Broadband Forum policy device that provides policy control decision and flow based charging control functionalities. BPCF 235 may provide network control (e.g., of fixed access network 160) regarding service data flow detection, network resource reservation, gating, QoS and flow based charging, etc. BPCF 235 may determine how a certain service data flow shall be treated, and may ensure that user plane traffic mapping and treatment is in accordance with a user's subscription profile. In one example implementation, BPCF 235 may include the features of fixed policy device 170 described above in connection with FIG. 1. BPCF 235 may handle multimedia applications, such as VoIP, IPTV, SMS, MMS, etc. applications, as well as data services (e.g., email services). BPCF 235 may implement a policy architecture that includes policy decision functions (e.g., policy determination) and/or policy enforcement functions (e.g., enforcing the determined policy). Alternatively, or additionally, the policy enforcement functions may be implemented in a device separate from BPCF 235.

ER 240 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, ER 240 may include a broadband network gateway (BNG) that applies bandwidth and QoS policies for fixed access network 160.

Fixed AAA device 245 may include one or more server devices, or other types of computation or communication devices, that gather, process, search, and/or provide information in a manner described herein. In one example implementation, fixed AAA device 245 may provide functionality to support authentication, authorization, and accounting functions. With regard to the authentication function, fixed AAA device 245 may verify a device's (e.g., UE's 110) specific digital identity provided via an identifier (e.g., a password, a digital certificate, a phone number, etc.) associated with the device. With regard to the authorization function, fixed AAA device 245 may grant or refuse privileges to a device (e.g., UE 110) for accessing specific services. With regard to the accounting function, fixed AAA device 245 may track consumption of network resources by users (e.g., by UE 110) and may use this information for management, planning, billing, etc.

RG 250 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, RG 250 may include a device used to connect devices in a customer premises to a network, such as the Internet or another wide area network (WAN). RG 250 may combine the functionalities of a modem, a network switch, a router, and a wireless access point in a single device. In one example implementation, RG 250 may be provided in fixed access network 160 or provided in CPE 150. RG 250 may be used to enforce policies for BPCF 235, and may be an aggregation device in fixed access network 160 for multiple customers.

In one example implementation, policy broker 190 may authenticate a subscriber moving between two access networks by connecting to wireless AAA device 220, HSS 225, fixed AAA device 245, and/or another authentication system and utilizing the authentication services provided by such devices. If policy broker 190 authenticates a subscriber, a visited service provider network may not be involved in performing the subscriber authentication.

Although FIG. 2 shows example devices/networks of network 200, in other implementations, network 200 may include fewer devices/networks, different devices/networks, differently arranged devices/networks, or additional devices/networks than depicted in FIG. 2. Alternatively, or additionally, one or more devices/networks of network 200 may perform one or more other tasks described as being performed by one or more other devices/networks of network 200.

Figure 3:
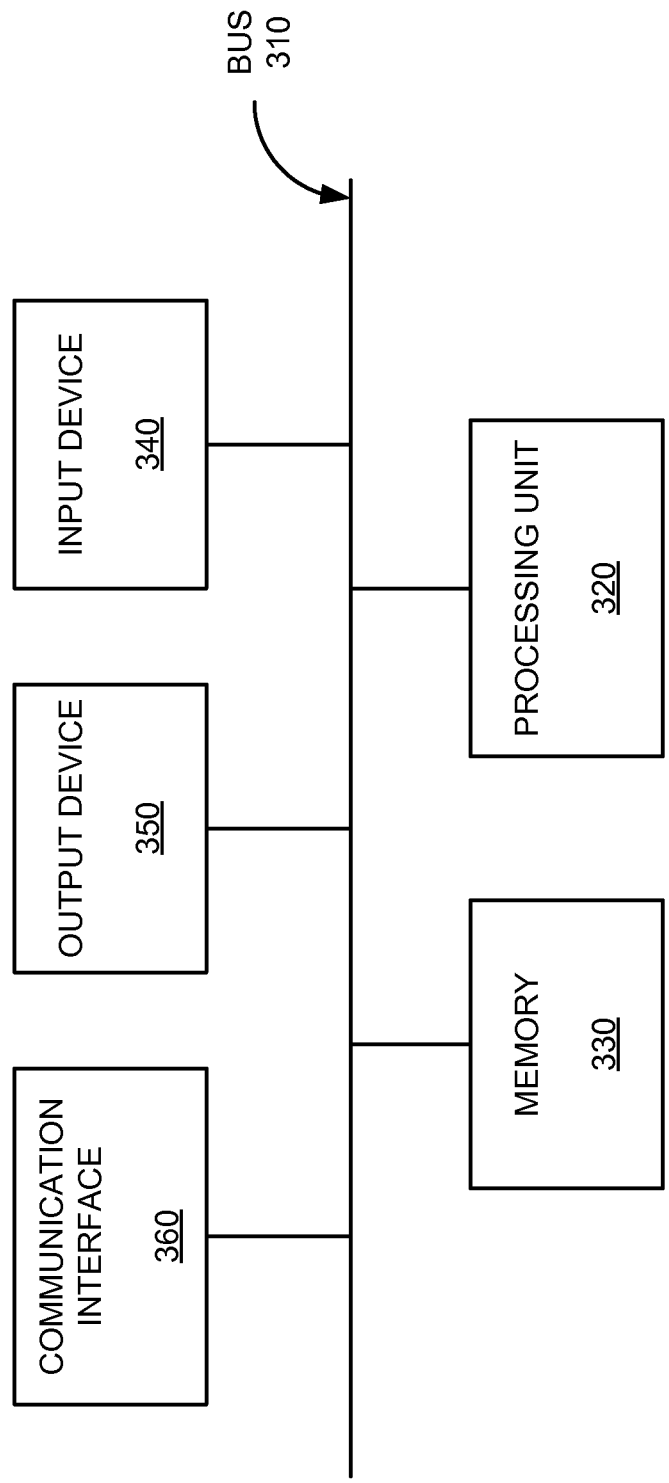
FIG. 3 is a diagram of example components of a device that may correspond to one of the devices of the networks depicted in FIGS. 1 and 2.

FIG. 3 is a diagram of example components of a device 300 that may correspond to one of the devices of network 100 or network 200. In one example implementation, one or more devices of networks 100 and 200 may include one or more devices 300. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of networks 100 and 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
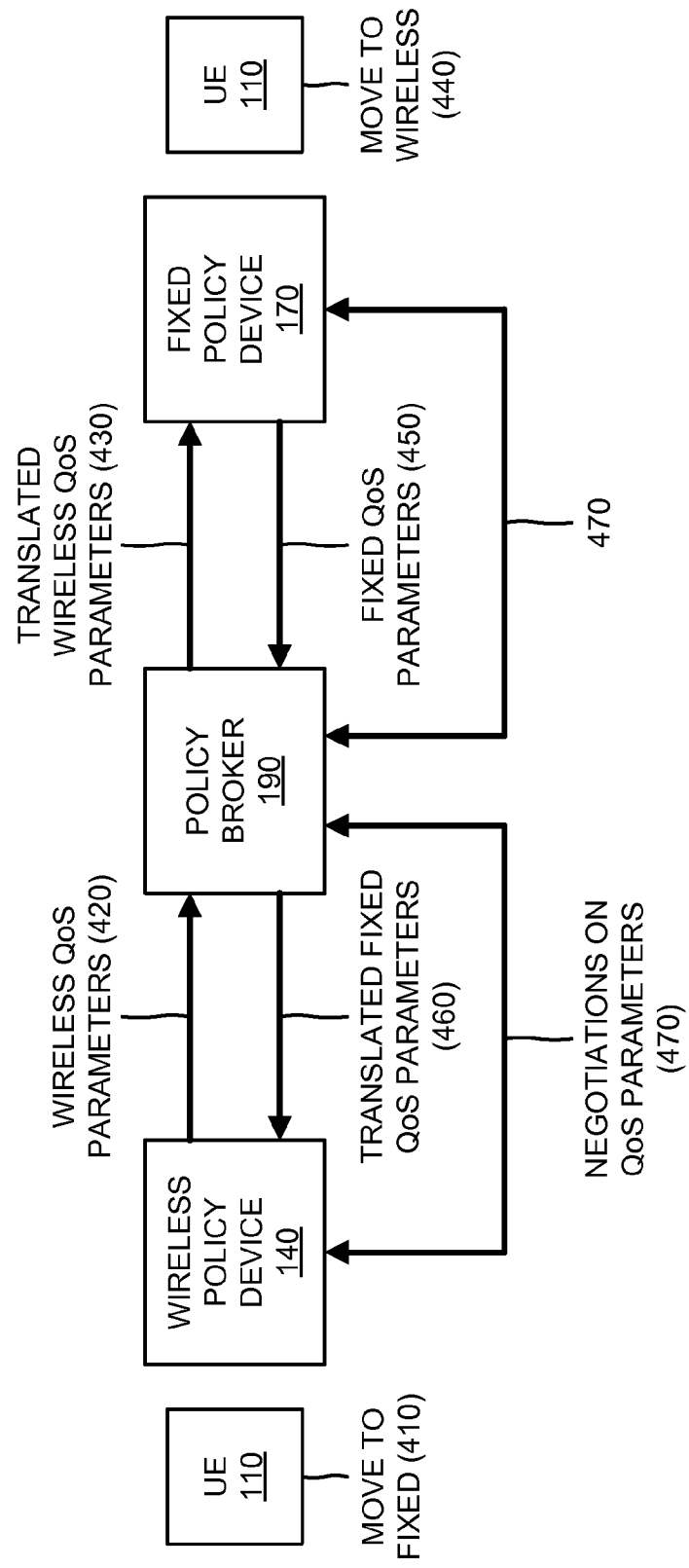
FIG. 4 is a diagram of example operations capable of being performed by an example portion of the network in FIG. 1.

FIG. 4 is a diagram of example operations capable of being performed by an example portion 400 of network 100. As shown in FIG. 4, network portion 400 may include UEs 110, wireless policy device 140, fixed policy device 170, and policy broker 190. UEs 110, wireless policy device 140, fixed policy device 170, and policy broker 190 may include the features described above in connection with, for example, one or more of FIGS. 1-3.

As further shown in FIG. 4, UE 110 associated with wireless policy device 140 may move from a wireless access network (e.g., associated with wireless policy device 140) to a fixed access network (e.g., associated with fixed policy device 170), as indicated by reference number 410. When UE 110 moves from the wireless access network to the fixed access network, wireless policy device 140 may provide wireless QoS parameters 420 to policy broker 190. Wireless QoS parameters 420 may include policy parameters, such as a QoS class identifier (QCI), an allocation and retention priority (ARP), a guaranteed bit rate (GBR), a maximum bit rate (MBR), etc. The QCI is a scalar that is used as a reference to access node-specific parameters that control bearer level packet forwarding treatment. The ARP includes information that enables determination of whether a bearer establishment/modification request can be accepted or needs to be rejected. The GBR is a bit rate that can be expected to be provided by a bearer. The MBR limits the bit rate that can be expected to be provided by the bearer.

Policy broker 190 may receive wireless QoS parameters 420 from wireless policy device 140, and may translate or map wireless QoS parameters 420 into translated wireless QoS parameters 430 that are understood by fixed policy device 170. In one example implementation, an operator of policy broker 190 may configure the translation of wireless QoS parameters 420 based on mapping standards, such as the standards set forth in GSM Association Official Document IR.34. Policy broker 190 may provide translated wireless QoS parameters 430 to fixed policy device 170. If fixed policy device 170 accepts translated wireless QoS parameters 430, fixed policy device 170 may enable UE 110 to connect to the fixed access network based on translated wireless QoS parameters 430.

As further shown in FIG. 4, UE 110 associated with fixed policy device 170 may move from the fixed access network (e.g., associated with fixed policy device 170) to the wireless access network (e.g., associated with wireless policy device 140), as indicated by reference number 440. When UE 110 moves from the fixed access network to the wireless access network, fixed policy device 170 may provide fixed QoS parameters 450 to policy broker 190. Fixed QoS parameters 450 may include policy parameters, such as guaranteed QoS information, a differentiated services code point (DSCP), etc. The DSCP is a scalable and coarse-grained mechanism for classifying and managing network traffic and providing QoS.

Policy broker 190 may receive fixed QoS parameters 450 from fixed policy device 170, and may translate or map fixed QoS parameters 450 into translated fixed QoS parameters 460 that are understood by wireless policy device 140. In one example implementation, an operator of policy broker 190 may configure the translation of fixed QoS parameters 450 based on mapping standards, such as the standards set forth in GSM Association Official Document IR.34. Policy broker 190 may provide translated fixed QoS parameters 460 to wireless policy device 140. If wireless policy device 140 accepts translated fixed QoS parameters 460, wireless policy device 140 may enable UE 110 to connect to the wireless access network based on translated fixed QoS parameters 460.

As further shown in FIG. 4, policy broker 190 may enable negotiations 470 on QoS parameters, such as wireless QoS parameters 420 and/or fixed QoS parameters 450, between wireless policy device 140 and fixed policy device 170. Negotiations 470 on the QoS parameters may occur when required network resources (e.g., in wireless access network 130 or fixed access network 160) are unavailable and/or the requirements of the QoS parameters cannot be achieved. For example, negotiations 470 may include fixed policy device 170 receiving a request for a particular bandwidth via translated wireless QoS parameters 430, and generating a counter offer (e.g., for a different bandwidth) when the particular bandwidth cannot be met. Wireless policy device 140 may receive the counter offer from fixed policy device 170 and may decide to accept or reject the counter offer. If wireless policy device 140 rejects the counter offer, policy broker 190 may terminate the session. Prior to negotiations 470, wireless policy device 140 or fixed policy device 170 may reserve network resources for UE 110 (e.g. depending upon whether UE 110 is moving to a wireless access network or a fixed access network). If negotiations 470 are unsuccessful, wireless policy device 140 or fixed policy device 170 may inform policy broker 190 of the non-acceptance, and policy broker 190 may instruct wireless policy device 140 or fixed policy device 170 to release the reserved network resources.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Figure 5:
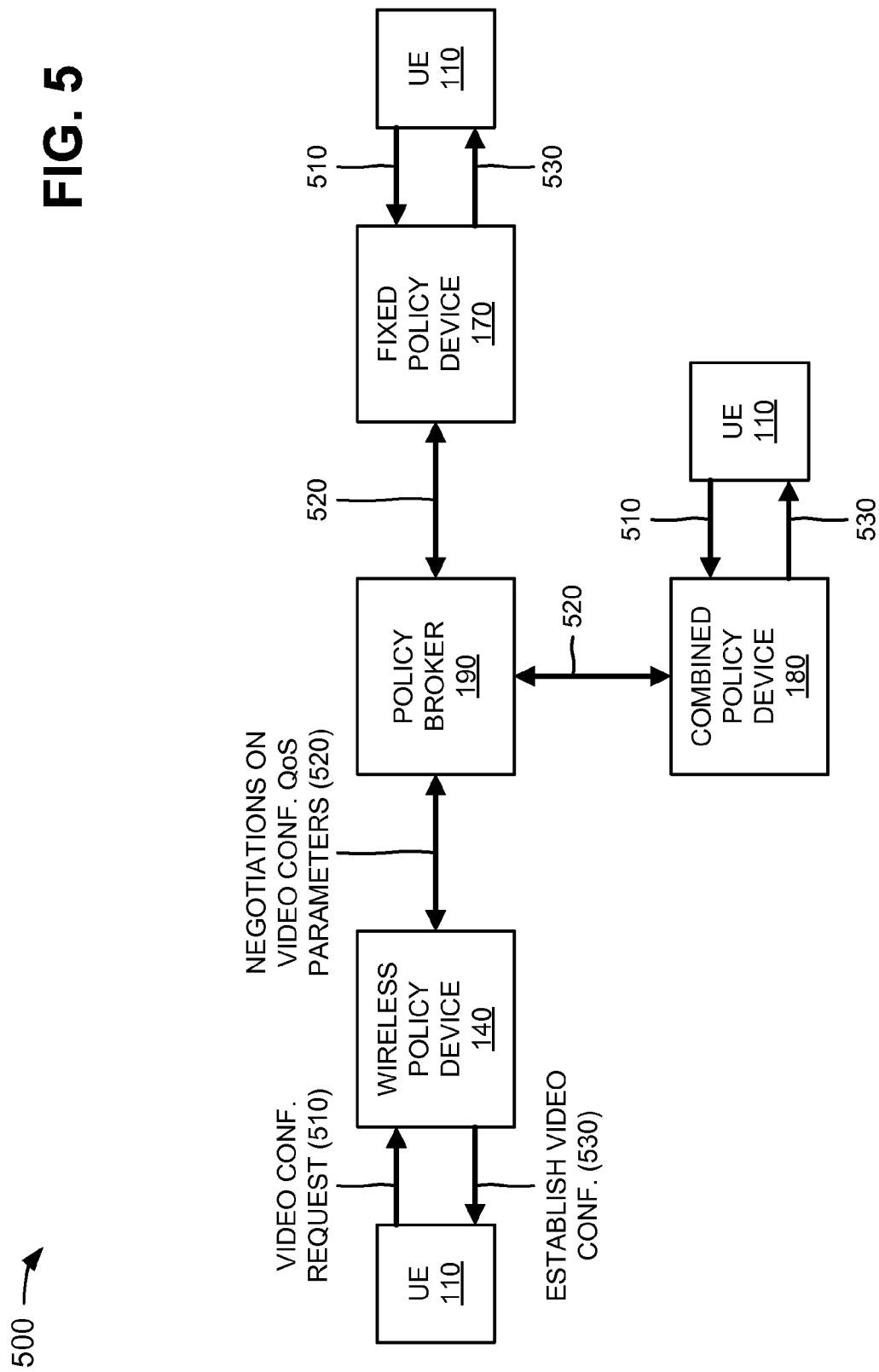
FIG. 5 is a diagram of example operations capable of being performed by another example portion of the network in FIG. 1.

FIG. 5 is a diagram of example operations capable of being performed by another example portion 500 of network 100. As shown in FIG. 5, network portion 500 may include UEs 110, wireless policy device 140, fixed policy device 170, combined policy device 180, and policy broker 190. UEs 110, wireless policy device 140, fixed policy device 170, combined policy device 180, and policy broker 190 may include the features described above in connection with, for example, one or more of FIGS. 1-4. In one example implementation, network portion 50 may depict negotiations on policy parameters for a session when more than two service providers are involved, such as a three-way session (e.g., video conferencing) across subscribers using three service providers.

As further shown in FIG. 5, UE 110 associated with wireless policy device 140 may provide a video conferencing request 510 to wireless policy device 140. UE 110 associated with fixed policy device 170 may provide video conferencing request 510 to fixed policy device 170. UE 110 associated with combined policy device 180 may provide video conferencing request 510 to combined policy device 180. Each of requests 510 may include a request to establish a video conference between UEs 110. Wireless policy device 140, fixed policy device 170, and combined policy device 180 may exchange video conference policy (e.g., QoS) parameters via policy broker 190. Wireless policy device 140, fixed policy device 170, and combined policy device 180 may perform negotiations 520 on the video conference QoS parameters, via policy broker 190. Negotiations 520 may include, for example, exchanging information regarding bandwidth requirements for the video conference, counter offers associated with the bandwidth requirements, etc.

Negotiations 520 on the video conference QoS parameters may be complete when wireless policy device 140, fixed policy device 170, and combined policy device 180 agree on the video conference QoS parameters. Once negotiations 520 are complete, wireless policy device 140, fixed policy device 170, and combined policy device 180 may establish the video conference, as indicated by reference number 530.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
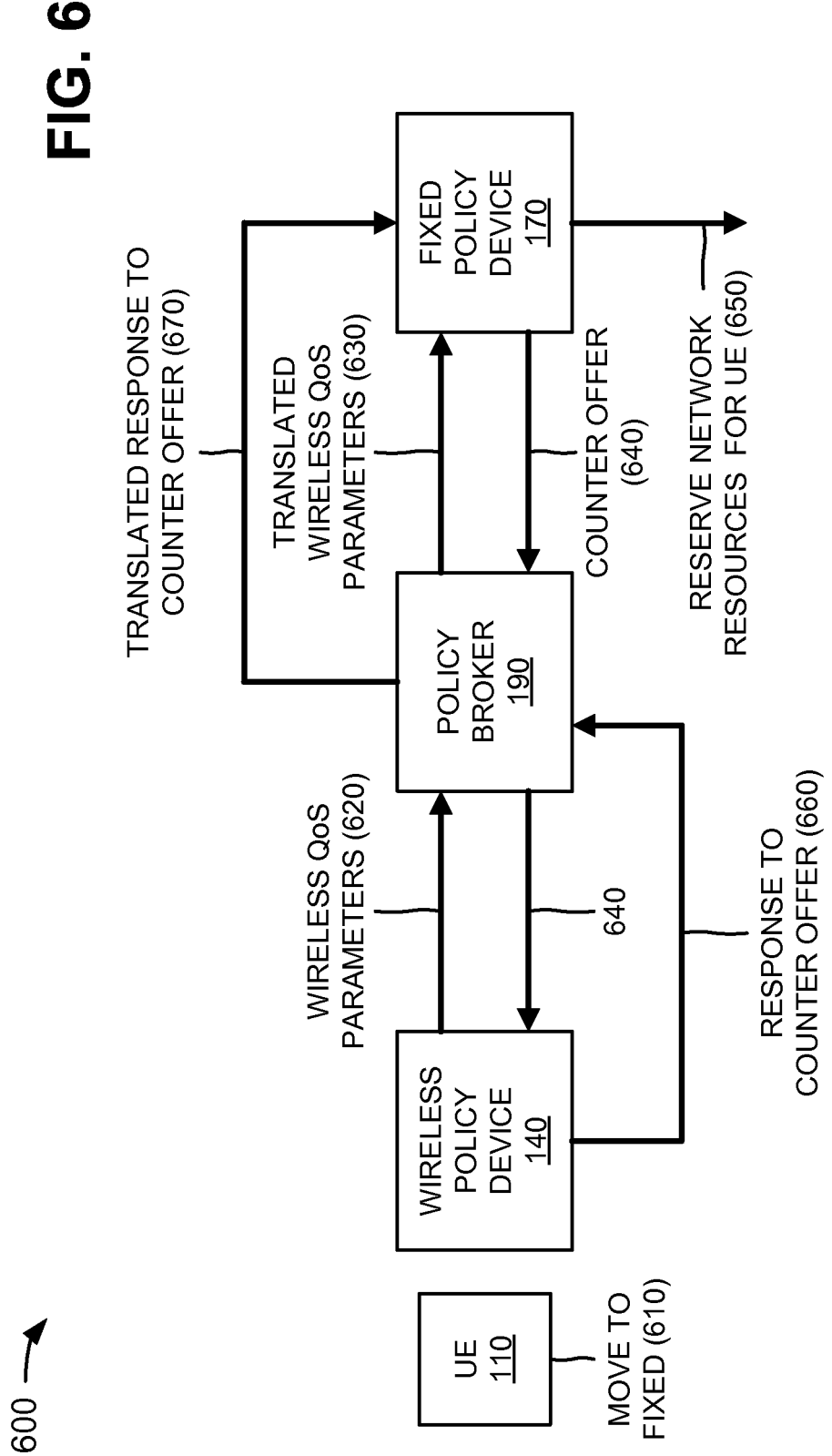
FIG. 6 is a diagram of example operations capable of being performed by still another example portion of the network in FIG. 1.

FIG. 6 is a diagram of example operations capable of being performed by still another example portion 600 of network 100. As shown in FIG. 6, network portion 600 may include UE 110, wireless policy device 140, fixed policy device 170, and policy broker 190. UE 110, wireless policy device 140, fixed policy device 170, and policy broker 190 may include the features described above in connection with, for example, one or more of FIGS. 1-5.

As further shown in FIG. 6, UE 110 associated with wireless policy device 140 may move from a wireless access network (e.g., associated with wireless policy device 140) to a fixed access network (e.g., associated with fixed policy device 170), as indicated by reference number 610. When UE 110 moves from the wireless access network to the fixed access network, wireless policy device 140 may provide wireless QoS parameters 620 to policy broker 190. Wireless QoS parameters 620 may include the policy parameters set forth above for wireless QoS parameters 420 (FIG. 4).

Policy broker 190 may receive wireless QoS parameters 620 from wireless policy device 140, and may translate or map wireless QoS parameters 620 into translated wireless QoS parameters 630 that are understood by fixed policy device 170. In one example implementation, an operator of policy broker 190 may configure the translation of wireless QoS parameters 620 based on mapping standards, such as the standards set forth in GSM Association Official Document IR.34. Policy broker 190 may provide translated wireless QoS parameters 630 to fixed policy device 170.

If fixed policy device 170 does not accept translated wireless QoS parameters 630, fixed policy device 170 may provide a counter offer 640 to policy broker 190. Counter offer 640 may include a request for modification of wireless QoS parameters 620. Prior to sending counter offer 640, fixed policy device 170 may reserve network resources for UE 110, as indicated by reference number 650. The reserved network resources may be used to ensure that UE 110 has network resources available if counter offer 640 is accepted. Policy broker 190 may receive counter offer 640, and may provide counter offer 640 to wireless policy device 140.

Policy broker 190 may receive a response 660 to counter offer 640 from wireless policy device 140. If counter offer 640 is accepted by wireless policy device 140, response 660 may include modified wireless QoS parameters. Policy broker 190 may translate response 660 (e.g., the modified wireless QoS parameters) to parameters understood by fixed policy device 170, and may provide the translated, modified QoS parameters to fixed policy device 170, as indicated by reference number 670. Fixed policy device 170 may enable UE 110 to connect to the fixed access network based on the translated, modified QoS parameters. If counter offer 640 is not accepted by wireless policy device 140, wireless policy device 140 may inform policy broker 190 of the non-acceptance, and policy broker 190 may instruct fixed policy device 170 to release the reserved network resources for UE 110.

Although FIG. 6 shows example components of network portion 600, in other implementations, network portion 600 may include fewer components, different components, differently arranged components, or additional components than depicted in FIG. 6. Additionally, or alternatively, one or more components of network portion 600 may perform one or more other tasks described as being performed by one or more other components of network portion 600.

Figure 7:
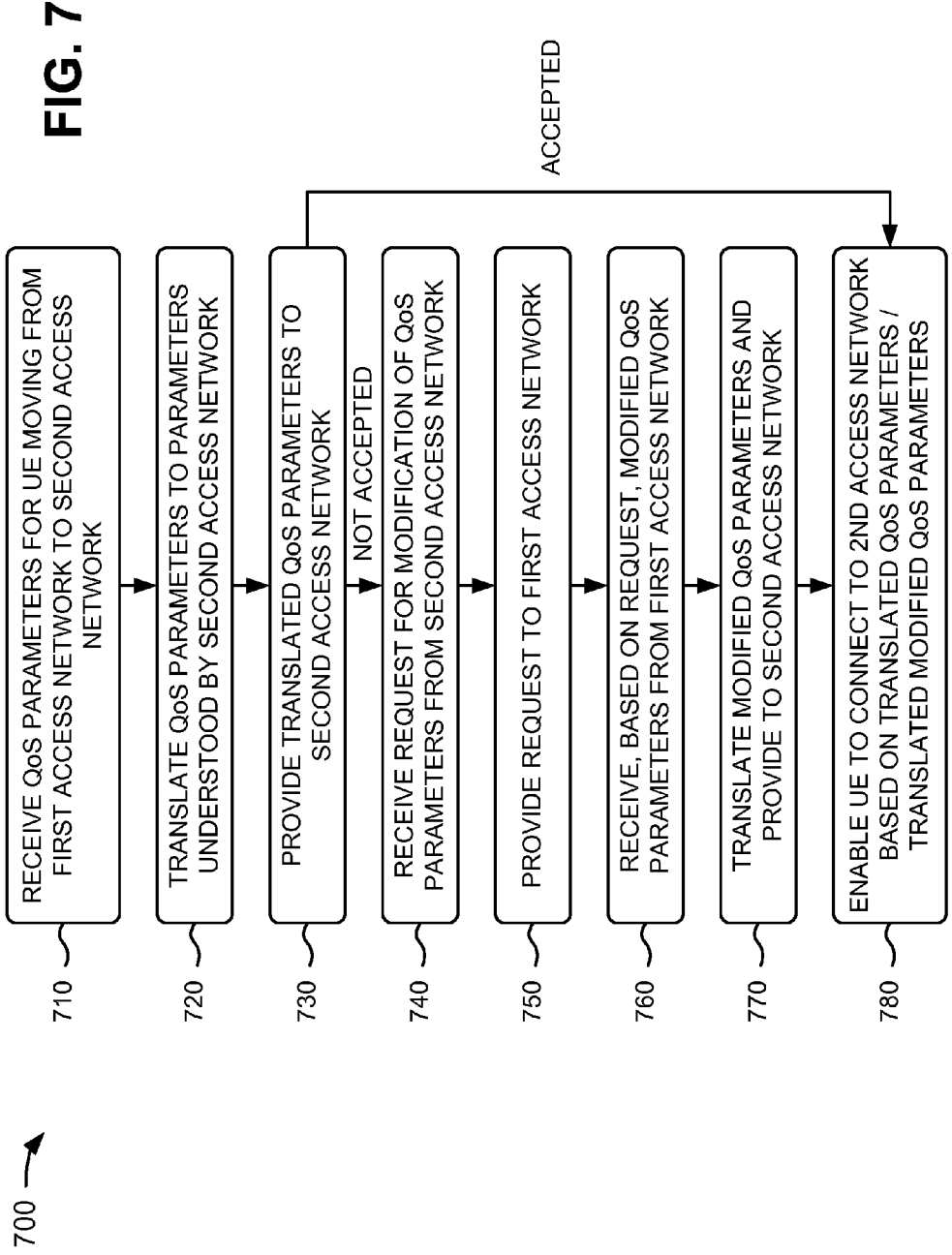
FIGS. 7 and 8 are flow charts of an example process for inter-policy server communication, via a policy broker, according to an implementation described herein.
Figure 8:
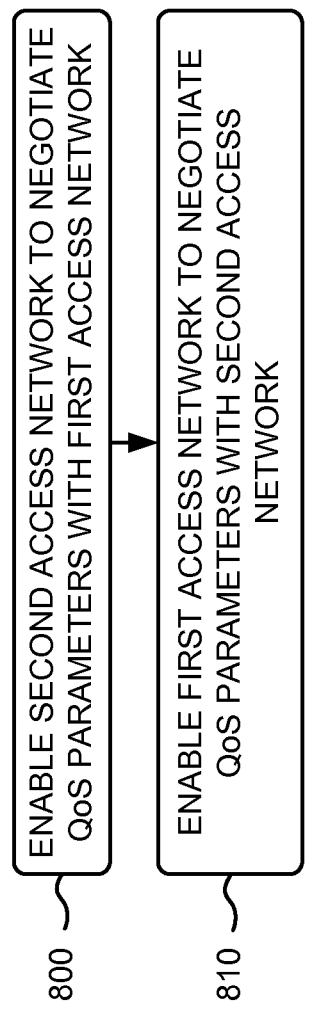

FIGS. 7 and 8 are flow charts of an example process 700 for inter-policy server communication, via a policy broker, according to an implementation described herein. In one implementation, process 700 may be performed by policy broker 190. Alternatively, or additionally, some or all of process 700 may be performed by another device or group of devices, including or excluding policy broker 190.

As shown in FIG. 7, process 700 may include receiving QoS parameters for a UE moving from a first access network to a second access network (block 710), and translating the QoS parameters to parameters understood by the second access network (block 720). For example, in an implementation described above in connection with FIG. 4, UE 110 associated with wireless policy device 140 may move from a wireless access network (e.g., associated with wireless policy device 140) to a fixed access network (e.g., associated with fixed policy device 170), as indicated by reference number 410. When UE 110 moves from the wireless access network to the fixed access network, wireless policy device 140 may provide wireless QoS parameters 420 to policy broker 190. Wireless QoS parameters 420 may include policy parameters, such as a QCI, an ARP, a GBR, a MBR, etc. Policy broker 190 may receive wireless QoS parameters 420 from wireless policy device 140, and may translate or map wireless QoS parameters 420 into translated wireless QoS parameters 430 that are understood by fixed policy device 170.

As further shown in FIG. 7, process 700 may include providing the translated QoS parameters to the second access network (block 730). If the translated QoS parameters are accepted by the second access network (block 730—ACCEPTED), process 700 may include enabling the UE to connect to the second access network based on the translated QoS parameters (block 780). For example, in an implementation described above in connection with FIG. 4, policy broker 190 may provide translated wireless QoS parameters 430 to fixed policy device 170. If fixed policy device 170 accepts translated wireless QoS parameters 430, fixed policy device 170 may enable UE 110 to connect to the fixed access network based on translated wireless QoS parameters 430.

Returning to FIG. 7, if the translated QoS parameters are not accepted by the second access network (block 730—NOT ACCEPTED), process 700 may include receiving a request for modification of the QoS parameters from the second access network (block 740), and providing the request to the first access network (block 750). For example, in an implementation described above in connection with FIG. 6, if fixed policy device 170 does not accept translated wireless QoS parameters 630, fixed policy device 170 may provide counter offer 640 to policy broker 190. Counter offer 640 may include a request for modification of wireless QoS parameters 620. Prior to sending counter offer 640, fixed policy device 170 may reserve network resources for UE 110, as indicated by reference number 650. The reserved network resources may be used to ensure that UE 110 has network resources available if counter offer 640 is accepted. Policy broker 190 may receive counter offer 640, and may provide counter offer 640 to wireless policy device 140.

As further shown in FIG. 7, process 700 may include receiving, based on the request, modified QoS parameters from the first access network (block 760), translating the modified QoS parameters and providing the translated, modified QoS parameters to the second access network (block 770). For example, in an implementation described above in connection with FIG. 6, policy broker 190 may receive response 660 to counter offer 640 from wireless policy device 140. If counter offer 640 is accepted by wireless policy device 140, response 660 may include modified wireless QoS parameters. Policy broker 190 may translate response 660 (e.g., the modified wireless QoS parameters) to parameters understood by fixed policy device 170, and may provide the translated, modified QoS parameters to fixed policy device 170, as indicated by reference number 670. If counter offer 640 is not accepted by wireless policy device 140, wireless policy device 140 may inform policy broker 190 of the non-acceptance, and policy broker 190 may instruct fixed policy device 170 to release the reserved network resources for UE 110.

Returning to FIG. 7, process 700 may include enabling the UE to connect to the second access network based on the translated, modified QoS parameters (block 780). For example, in an implementation described above in connection with FIG. 6, fixed policy device 170 may enable UE 110 to connect to the fixed access network based on the translated, modified QoS parameters.

Process block 730 may include the process blocks depicted in FIG. 8. As shown in FIG. 8, process block 730 may include enabling the second access network to negotiate the QoS parameters with the first access network (block 800) and/or enabling the first access network to negotiate the QoS parameters with the second access network (block 810). For example, in an implementation described above in connection with FIG. 4, policy broker 190 may enable negotiations 470 on QoS parameters, such as wireless QoS parameters 420 and/or fixed QoS parameters 450, between wireless policy device 140 and fixed policy device 170. Negotiations 470 on the QoS parameters may occur when required network resources (e.g., in wireless access network 130 or fixed access network 160) are unavailable and/or the requirements of the QoS parameters cannot be achieved.

Systems and/or methods described herein may provide a policy broker between policy devices (e.g., a PCRF device, a BPCF device, etc.) of wireless and fixed access networks so that policy/QoS parameter may be exchanged between the policy devices.

The foregoing description of implementations provides illustration and description, but is not intended to be exhaustive or to limit the invention to the precise form disclosed. Modifications and variations are possible in light of the above teachings or may be acquired from practice of the invention.

Furthermore, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a computing device, policy parameters for a user equipment moving from a first access network to a second access network, wherein the policy parameters specify at least one of a Quality of Service Class Identifier (QCI) value, an Allocation and Retention Priority (ARP) value, a Guaranteed Bit Rate (GBR) value, or a Maximum Bit Rate (MBR) value;
translating, by the computing device, the received policy parameters to parameters understood by the second access network;
providing, by the computing device, the translated policy parameters to the second access network;
receiving, from the second access network, a request for modification of the at least one of a QCI value, an ARP value, a GBR value, or an MBR value;
providing the request to the first access network;
receiving, based on the request, modified policy parameters from the first access network, wherein the modified policy parameters specify a different value for the at least one of a QCI value, an ARP value, a GBR value, or an MBR value;
translating the modified policy parameters to parameters understood by the second access network; and
providing the modified, translated policy parameters to the second access network, wherein the user equipment connects to the second access network in accordance with the modified, translated policy parameters.

2. The method of claim 1, wherein the computing device includes a policy broker located in a third network separate from the first access network and the second access network.

3. The method of claim 1, where at least one of the first access network and the second access network include:
a wireless access network,
a fixed access network, or
an integrated wireless and fixed access network.

4. The method of claim 1, wherein the policy parameters are received from a Policy and Charging Rules Function (PCRF) device of the first access network.

5. The method of claim 1, wherein, when the second access network includes a fixed access network, the parameters understood by the second access network include one or more of:
guaranteed quality of service (QoS) information, or
a differentiated services code point (DSCP).

6. The method of claim 1, further comprising:
enabling the first access network and the second access network to conduct negotiations with respect to the policy parameters.

7. A device, comprising:
a memory storing instructions; and
a processor configured to execute the instructions to:
receive policy parameters for a user equipment moving from a first access network to a second access network, wherein the policy parameters specify at least one of a Quality of Service Class Identifier (QCI) value, an Allocation and Retention Priority (ARP)

value, a Guaranteed Bit Rate (GBR) value, or a Maximum Bit Rate (MBR) value,
translate the policy parameters to parameters understood by the second access network,
provide the translated policy parameters to the second access network;
receive, from the second access network, a request for modification of the at least one of a QCI value, an ARP value, a GBR value, or an MBR value,
provide the request to the first access network,
receive, based on the request, modified policy parameters from the first access network, wherein the modified policy parameters specify a different value for the at least one of a QCI value, an ARP value, a GBR value, or an MBR value,
translate the modified policy parameters to parameters understood by the second access network, and
provide the modified, translated policy parameters to the second access network, wherein the user equipment connects to the second access network in accordance with the modified, translated policy parameters.

8. The device of claim 7, where the device includes a policy broker device provided in a network separate from the first access network and the second access network.

9. The device of claim 7, where at least one of the first access network and the second access network include:
a wireless access network,
a fixed access network, or
a combined wireless and fixed access network.

10. The device of claim 7, where the second access network reserves resources in the second access network prior to providing the request to the device.

11. The device of claim 10, where the second access network releases the reserved resources in the second access network when the modified, translated policy parameters are not accepted by the second access network.

12. The device of claim 7, wherein the policy parameters are received from a Policy and Charging Rules Function (PCRF) device of the first access network.

13. The device of claim 7, wherein, when the second access network includes a fixed access network, the policy parameters include one or more of:
guaranteed quality of service (QoS) information, or
a differentiated services code point (DSCP).

14. The device of claim 7, wherein the processor is further configured to execute the instructions to:
enable the first access network and the second access network to conduct negotiations with respect to the policy parameters.

15. The device of claim 7, where:
the first access network includes a first policy device,
the second access network includes a second policy device, and
the device communicates with the first policy device and the second policy device.

16. The device of claim 7, where policy schemes associated with the first access network and the second access network are pre-provisioned in the device or are received from the first access network and the second access network.

17. The device of claim 7, wherein the processor is further configured to execute the instructions to:
receive additional policy parameters for a third access network,
translate the additional policy parameters to parameters understood by the second access network, and
provide the translated additional policy parameters to the second access network, wherein, when the translated additional policy parameters are accepted by the second access network, the user equipment connects to the second access network in accordance with the translated additional policy parameters.

18. One or more non-transitory computer-readable media storing instructions executable by one or more processors of a device, the one or more non-transitory media comprising:
one or more instructions to receive policy parameters for a user equipment moving from a first access network to a second access network, wherein the policy parameters specify at least one of a Quality of Service Class Identifier (QCI) value, an Allocation and Retention Priority (ARP) value, a Guaranteed Bit Rate (GBR) value, or a Maximum Bit Rate (MBR) value;
one or more instructions to translate the policy parameters to parameters understood by the second access network;
one or more instructions to provide the translated policy parameters to the second access network;
one or more instructions to receive, from the second access network, a request for modification of the at least one of a QCI value, an ARP value, a GBR value, or an MBR value;
one or more instructions to provide the request to the first access network;
one or more instructions to receive, based on the request, modified policy parameters from the first access network, wherein the modified policy parameters specify a different value for the at least one of a QCI value, an ARP value, a GBR value, or an MBR value;
one or more instructions to translate the modified policy parameters to parameters understood by the second access network; and
one or more instructions to provide the modified, translated policy parameters to the second access network, wherein the user equipment connects to the second access network in accordance with the modified, translated policy parameters.

19. The one or more non-transitory media of claim 18, wherein the one or more non-transitory media further comprise:
one or more instructions to enable the first access network and the second access to conduct negotiations with respect to the policy parameters.

20. The one or more non-transitory media of claim 18, wherein at least one of the first access network and the second access network include:
a wireless access network,
a fixed access network, or
a combined wireless and fixed access network.

21. The one or more non-transitory media of claim 18, wherein the policy parameters are received from a Policy and Charging Rules Function (PCRF) device of the first access network.

22. The one or more non-transitory media of claim 18, wherein, when the second access network includes a fixed access network, the policy parameters include one or more of:
guaranteed quality of service (QoS) information, or
a differentiated services code point (DSCP).

* * * * *